March 28, 1961  R. D. CRUTHIS ET AL  2,976,947
PIVOTED DASH ASSEMBLY FOR TRACTORS AND THE LIKE
Filed Jan. 22, 1959  2 Sheets-Sheet 1

INVENTORS
Robert D. Cruthis
BY Thomas E. Hrodey
Alfred W. Sieving
ATTORNEYS

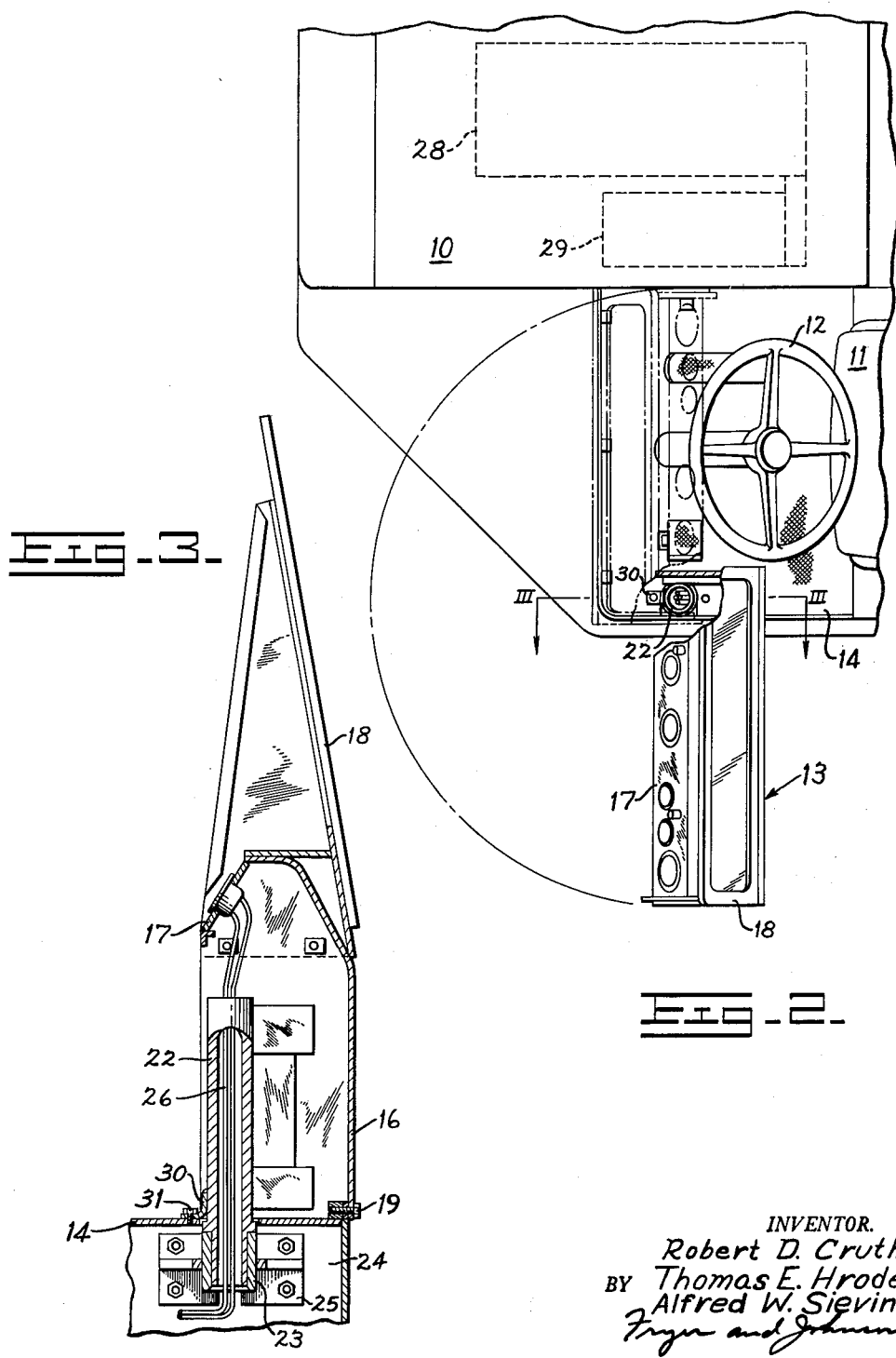

2,976,947
PIVOTED DASH ASSEMBLY FOR TRACTORS AND THE LIKE

Robert D. Cruthis, Thomas E. Hrodey, and Alfred W. Sieving, Decatur, Ill., assignors to Caterpillar Tractor Co., Peoria, Ill., a corporation of California Filed Jan. 22, 1959, Ser. No. 788,356

1 Claim. (Cl. 180—90)

This invention relates to tractors or trucks which have an operator's station disposed alongside the engine and pertains particularly to an operator's station constructed in a manner to enable a portion thereof readily to be moved away from the engine to facilitate adjustment and repair of the engine when necessary.

The invention will be described herein in its application to a two-wheel tractor for which it was specifically designed, though its adaptability to various types of tractors and trucks where the operator's station is disposed alongside the engine will be readily appreciated.

The tractors where the operator's seat is disposed to one side of the engine even though it be slightly to the rear thereof, the dash assembly which provides a forward shield for the operator and supports various instruments, gauges and the like constitutes an obstruction which hinders the necessary work of servicing parts of the engine.

One of the objects of the present invention is to provide a dash assembly in a tractor or other machine of the character described which can readily be moved to one side and away from the engine. Another object of the invention is to provide such an assembly which is pivotally supported for such movement and in which cables or wires and the like leading to instruments supported by the dash follow generally the axis of pivotal movement to enable them to remain in place when the assembly is moved.

Further objects and advantages of the invention are made apparent in the following specification wherein reference is made to the accompanying drawings.

In the drawings:

Fig. 2 is a fragmentary plan view showing the driver's station of the same tractor with the dash assembly swung to one side, its normal position being indicated in broken lines; and Fig. 3 is a sectional view taken on the line III—III of Fig. 2 but showing the dash assembly in its normal position.

Figure 1:
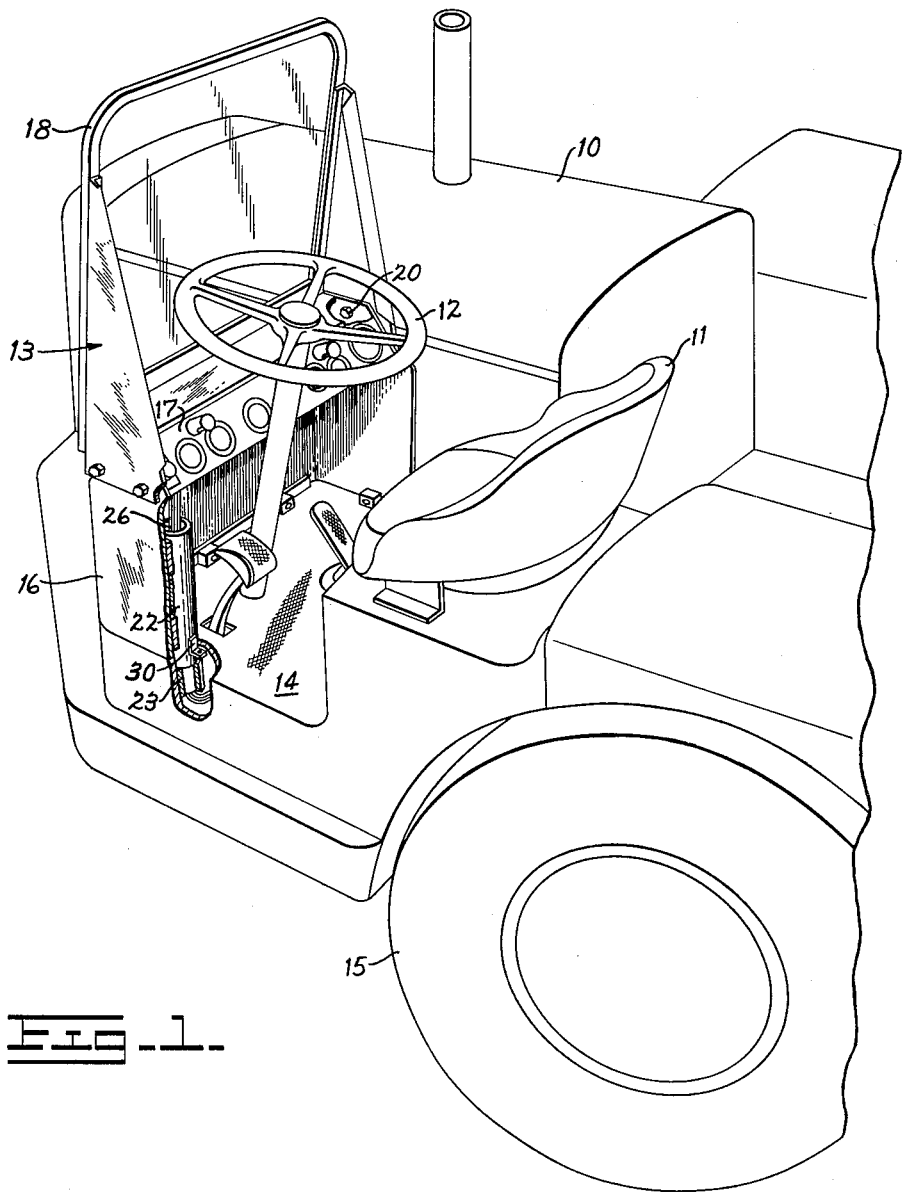
Fig. 1 is a perspective view of the forward portion of a two-wheel tractor having a dash assembly embodying the present invention.

Referring first to Figs. 1 and 2, the tractor upon which the dash assembly is mounted is shown as having an engine compartment 10 with an operator's station alongside the engine compartment and comprising a seat 11, steering wheel 12 and dash assembly generally indicated at 13, all of which are supported on the operator's platform 14. One of the wheels of the tractor is shown at 15 in Fig. 1.

The dash assembly 13 comprises a protective metal shield 16 which rises from the platform 14 and which supports an instrument panel 17 and a windshield structure 18. In accordance with the present invention, the entire dash assembly is held in place by a plurality of cap screws as shown at 19 in Fig. 3 which secure it with respect to the platform 14 along its forward edge and a single cap screw as shown at 20 in Fig. 1 securing it to the engine compartment 10. A vertically disposed tubular member 22 is secured as for example by welding to a side portion of the shield 16 and extends downwardly through the platform 14 into a bearing 23 which is secured to a downwardly depending skirt 24 of the platform 14 by bracket means illustrated at 25 in Fig. 3.

Wires or cables schematically indicated at 26 which lead to various instruments on the panel 17 from other parts of the tractor are lead through the tubular member 22 so that they are not disturbed upon pivotal movement of the dash assembly about the tubular member as a center.

When it is desired to service or work upon the engine of the tractor, the cap screws 19 and 20 are removed and the entire dash assembly may be swung to an outward position such as indicated in full lines in Fig. 2. In this figure, the position of the main engine of a tractor in the engine compartment 10 is indicated in dotted lines at 28 and the position of the starting engine is indicated at 29. Thus work upon the starting engine or other equipment in its vicinity is facilitated by movement of the dash assembly in the manner described.

A further means of securing the dash assembly in its normal position may be employed and is illustrated as an angular lug 30 secured as by welding to the tubular member 22 and to the platform 14 by a cap screw 31. This cap screw would, of course, be removed prior to swinging the dash assembly aside.

We claim.

In a tractor or the like which comprises an engine compartment, an operator's platform which is formed as a part of the tractor disposed alongside and extending outwardly from the engine compartment, an operator's seat and control means supported by the platform, and a dash assembly which includes a shield rising from the forward edge of the platform, an instrument panel supported by the shield, and a windshield structure also supported by the shield and extending upwardly therefrom all adjacent the engine compartment, the improvement which comprises a vertical pivotal connection between said dash assembly and said platform at a point disposed outwardly and forwardly of said platform to enable the dash assembly to be swung to a position entirely away from the engine compartment, said pivotal connection comprising a vertically disposed tubular bearing supported by the platform and a tubular pivot pin carried by the dash assembly and received in said bearing, and flexible conducting members extending through said tubular pivot pin and leading to the instrument panel.

References Cited in the file of this patent

UNITED STATES PATENTS

| | | |
|---|---|---|
| 1,502,344 | Murray | July 22, 1924 |
| 2,665,414 | Hubacker et al. | Jan. 5, 1954 |
| 2,669,317 | Celien | Feb. 16, 1954 |
| 2,868,310 | Lee | Jan. 13, 1959 |
| 2,873,979 | Venditty et al. | Feb. 17, 1959 |

FOREIGN PATENTS

| | | |
|---|---|---|
| 233,545 | Great Britain | May 14, 1925 |